US012802695B2

(12) United States Patent
Shlomot et al.

(10) Patent No.: US 12,802,695 B2
(45) Date of Patent: Nov. 17, 2026

(54) STEREO SIGNAL ENCODING METHOD AND APPARATUS, AND STEREO SIGNAL DECODING METHOD AND APPARATUS

(71) Applicant: Huawei Technologies Co., Ltd., Shenzhen (CN)

(72) Inventors: Eyal Shlomot, Long Beach, CA (US); Jonathan Alastair Gibbs, Cumbria (GB); Haiting Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 191 days.

(21) Appl. No.: 18/917,494

(22) Filed: Oct. 16, 2024

(65) Prior Publication Data

US 2025/0037727 A1 Jan. 30, 2025

Related U.S. Application Data

(63) Continuation of application No. 18/362,453, filed on Jul. 31, 2023, now Pat. No. 12,148,436, which is a (Continued)

(30) Foreign Application Priority Data

Jun. 29, 2018 (CN) ......................... 201810701919.1

(51) Int. Cl.
*G10L 19/032* (2013.01)
*G10L 19/008* (2013.01)
(Continued)

(52) U.S. Cl.
CPC .......... *G10L 19/008* (2013.01); *G10L 19/038* (2013.01); *G10L 19/06* (2013.01); *G10L 19/032* (2013.01); *G10L 19/07* (2013.01)

(58) Field of Classification Search
None
See application file for complete search history.

(56) References Cited

U.S. PATENT DOCUMENTS 5,307,441 A 4/1994 Tzeng
7,013,269 B1 3/2006 Bhaskar et al.
(Continued)

FOREIGN PATENT DOCUMENTS

CN 101067931 A 11/2007
CN 101393743 A 3/2009
(Continued)

OTHER PUBLICATIONS

Helmrich, C., et al., "Efficient Transform Coding of Two-Channel Audio Signals by Means of Complex-Valued Stereo Prediction", 2011 IEEE International Conference on Acoustics, Speech and Signal Processing (ICASSP), IEEE, Jul. 12, 2011, pp. 497-500.
(Continued)

*Primary Examiner* — Jakieda R Jackson
(74) *Attorney, Agent, or Firm* — Conley Rose, P.C.

(57) ABSTRACT

A stereo signal encoding method includes performing spectrum broadening on a quantized line spectral frequency (LSF) parameter of a primary channel signal in a current frame in a stereo signal to obtain a spectrum-broadened LSF parameter of the primary channel signal, determining a prediction residual of an LSF parameter of a secondary channel signal in the current frame based on an original LSF parameter of the secondary channel signal and the spectrum-broadened LSF parameter of the primary channel signal, and performing a quantization on the prediction residual of the LSF parameter of the secondary channel signal.

20 Claims, 10 Drawing Sheets

Related U.S. Application Data continuation of application No. 17/893,488, filed on Aug. 23, 2022, now Pat. No. 11,790,923, which is a continuation of application No. 17/135,539, filed on Dec. 28, 2020, now Pat. No. 11,462,223, which is a continuation of application No. PCT/CN2019/093404, filed on Jun. 27, 2019.

(51) Int. Cl.

| | |
|---|---|
| ***G10L 19/038*** | (2013.01) |
| ***G10L 19/06*** | (2013.01) |
| *G10L 19/07* | (2013.01) |

(56) References Cited

U.S. PATENT DOCUMENTS

| | | | | |
|---|---|---|---|---|
| 10,580,416 | B2 * | 3/2020 | Vasilache | G10L 19/005 |
| 11,804,230 | B2 * | 10/2023 | Jang | G06N 3/04 |
| 2003/0014249 | A1 | 1/2003 | Ramo | |
| 2007/0063877 | A1 * | 3/2007 | Shmunk | G10L 19/0204<br>704/E19.018 |
| 2010/0198588 | A1 | 8/2010 | Sudo et al. | |
| 2011/0004466 | A1 * | 1/2011 | Morii | G10L 19/008<br>704/201 |
| 2013/0223633 | A1 | 8/2013 | Oshikiri et al. | |
| 2017/0154632 | A1 * | 6/2017 | Sung | G10L 19/038 |
| 2018/0268826 | A1 * | 9/2018 | Vaillancourt | G10L 19/008 |
| 2019/0237087 | A1 | 8/2019 | Vaillancourt et al. | |
| 2021/0012784 | A1 * | 1/2021 | Fotopoulou | G10L 19/008 |

FOREIGN PATENT DOCUMENTS

| | | | |
|---|---|---|---|
| CN | 101518083 | A | 8/2009 |
| CN | 101695150 | A | 4/2010 |
| CN | 102044250 | A | 5/2011 |
| CN | 102243876 | A | 11/2011 |
| CN | 103180899 | A | 6/2013 |
| JP | H03211599 | A | 9/1991 |
| JP | 2007529021 | A | 10/2007 |
| JP | 2014063202 | A | 4/2014 |
| WO | 0223529 | A1 | 3/2002 |
| WO | 2005059899 | A1 | 6/2005 |
| WO | 2012066727 | A1 | 5/2012 |
| WO | 2017049398 | A1 | 3/2017 |
| WO | 2017049399 | A | 3/2017 |

OTHER PUBLICATIONS

Shlomot, E., "Delayed Decision Switched Prediction Multi-Stage LSF Quantization," 1995, 2 pages.

* cited by examiner

STEREO SIGNAL ENCODING METHOD AND APPARATUS, AND STEREO SIGNAL DECODING METHOD AND APPARATUS

CROSS-REFERENCE TO RELATED APPLICATIONS

This is a continuation of U.S. patent application Ser. No. 18/362,453 filed on Jul. 31, 2023, which is a continuation of U.S. patent application Ser. No. 17/893,488 filed on Aug. 23, 2022, now U.S. Pat. No. 11,790,923, which is a continuation of U.S. patent application Ser. No. 17/135,539 filed on Dec. 28, 2020, now U.S. Pat. No. 11,462,223, which is a continuation of International Patent Application No. PCT/CN2019/093404 filed on Jun. 27, 2019, which claims priority to Chinese Patent Application No. 201810701919.1 filed on Jun. 29, 2018, all of which are hereby incorporated by reference.

TECHNICAL FIELD

This disclosure relates to the audio field, and in particular, to a stereo signal encoding method and apparatus, and a stereo signal decoding method and apparatus.

BACKGROUND

In a time-domain stereo encoding/decoding method, an encoder side first performs inter-channel time difference estimation on a stereo signal, performs time alignment based on an estimation result, then performs time-domain downmixing on a time-aligned signal, and finally separately encodes a primary channel signal and a secondary channel signal that are obtained after the downmixing, to obtain an encoded bitstream.

Encoding the primary channel signal and the secondary channel signal may include determining a linear prediction coefficient (LPC) of the primary channel signal and an LPC of the secondary channel signal, respectively converting the LPC of the primary channel signal and the LPC of the secondary channel signal into a line spectral frequency (LSF) parameter of the primary channel signal and an LSF parameter of the secondary channel signal, and then performing quantization on the LSF parameter of the primary channel signal and the LSF parameter of the secondary channel signal.

A process of performing quantization on the LSF parameter of the primary channel signal and the LSF parameter of the secondary channel signal may include quantizing an original LSF parameter of the primary channel signal to obtain a quantized LSF parameter of the primary channel signal, performing reusing determining based on a distance between the LSF parameter of the primary channel signal and the LSF parameter of the secondary channel signal, and if the distance between the LSF parameter of the primary channel signal and the LSF parameter of the secondary channel signal is greater than or equal to a threshold, determining that the LSF parameter of the secondary channel signal does not meet a reusing condition, and an original LSF parameter of the secondary channel signal needs to be quantized to obtain a quantized LSF parameter of the secondary channel signal, and writing the quantized LSF parameter of the primary channel signal and the quantized LSF parameter of the secondary channel signal into the bitstream. If the distance between the LSF parameter of the primary channel signal and the LSF parameter of the secondary channel signal is less than the threshold, only the quantized LSF parameter of the primary channel signal is written into the bitstream. In this case, the quantized LSF parameter of the primary channel signal may be used as the quantized LSF parameter of the secondary channel signal.

In this encoding process, if the LSF parameter of the secondary channel signal does not meet the reusing condition, both the quantized LSF parameter of the primary channel signal and the quantized LSF parameter of the secondary channel signal need to be written into the bitstream. Therefore, a relatively large quantity of bits is required for encoding.

SUMMARY

This disclosure provides a stereo signal encoding method and apparatus, and a stereo signal decoding method and apparatus, to help reduce a quantity of bits required for encoding when an LSF parameter of a secondary channel signal does not meet a reusing condition.

According to a first aspect, this disclosure provides a stereo signal encoding method. The encoding method includes performing spectrum broadening on a quantized LSF parameter of a primary channel signal in a current frame in a stereo signal, to obtain a spectrum-broadened LSF parameter of the primary channel signal, determining a prediction residual of an LSF parameter of a secondary channel signal in the current frame based on an original LSF parameter of the secondary channel signal and the spectrum-broadened LSF parameter of the primary channel signal, and performing quantization on the prediction residual of the LSF parameter of the secondary channel signal.

In the encoding method, spectrum broadening is first performed on the quantized LSF parameter of the primary channel signal, then the prediction residual of the secondary channel signal is determined based on the spectrum-broadened LSF parameter and the original LSF parameter of the secondary channel signal, and quantization is performed on the prediction residual. A value of the prediction residual is less than a value of the LSF parameter of the secondary channel signal, and even an order of magnitude of the value of the prediction residual is less than an order of magnitude of the value of the LSF parameter of the secondary channel signal. Therefore, compared with separately performing quantization on the LSF parameter of the secondary channel signal, performing quantization on the prediction residual helps reduce a quantity of bits required for encoding.

With reference to the first aspect, in a first possible implementation, performing spectrum broadening on a quantized LSF parameter of a primary channel signal in a current frame in a stereo signal, to obtain a spectrum-broadened LSF parameter of the primary channel signal includes performing pull-to-average processing on the quantized LSF parameter of the primary channel signal to obtain the spectrum-broadened LSF parameter, where the pull-to-average processing is performed according to the following formula:

$$LSF_{SB}(i) = \beta \cdot LSF_P(i) + (1 - \beta) \cdot \overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of the original LSF parameter of the secondary channel signal, 1≤i≤M, i is an integer, and M represents a linear prediction parameter.

With reference to the first aspect, in a second possible implementation, performing spectrum broadening on a quantized LSF parameter of a primary channel signal in a current frame in a stereo signal, to obtain a spectrum-broadened LSF parameter of the primary channel signal includes converting the quantized LSF parameter of the primary channel signal into an LPC, modifying the LPC to obtain a modified LPC of the primary channel signal, and converting the modified LPC of the primary channel signal into an LSF parameter, where the LSF parameter obtained through conversion is the spectrum-broadened LSF parameter of the primary channel signal.

With reference to the first aspect or the first or second possible implementation, in a third possible implementation, the prediction residual of the LSF parameter of the secondary channel signal is a difference between the original LSF parameter of the secondary channel signal and the spectrum-broadened LSF parameter of the primary channel signal.

With reference to the first aspect or the first or second possible implementation, in a fourth possible implementation, determining a prediction residual of an LSF parameter of a secondary channel signal in the current frame based on an original LSF parameter of the secondary channel signal and the spectrum-broadened LSF parameter of the primary channel signal includes performing two-stage prediction on the LSF parameter of the secondary channel signal based on the spectrum-broadened LSF parameter of the primary channel signal to obtain a predicted LSF parameter of the secondary channel signal, and using a difference between the original LSF parameter of the secondary channel signal and the predicted LSF parameter as the prediction residual of the secondary channel signal.

With reference to any one of the first aspect or the foregoing possible implementations, in a fifth possible implementation, before determining a prediction residual of an LSF parameter of a secondary channel signal in the current frame based on an original LSF parameter of the secondary channel signal and the spectrum-broadened LSF parameter of the primary channel signal, the encoding method further includes determining that the LSF parameter of the secondary channel signal does not meet a reusing condition.

Whether the LSF parameter of the secondary channel signal does not meet the reusing condition may be determined according to other approaches, for example, in the manner described in the background.

According to a second aspect, this disclosure provides a stereo signal decoding method. The decoding method includes obtaining a quantized LSF parameter of a primary channel signal in a current frame from a bitstream, performing spectrum broadening on the quantized LSF parameter of the primary channel signal, to obtain a spectrum-broadened LSF parameter of the primary channel signal, obtaining a prediction residual of an LSF parameter of a secondary channel signal in the current frame in a stereo signal from the bitstream, and determining a quantized LSF parameter of the secondary channel signal based on the prediction residual of the LSF parameter of the secondary channel signal and the spectrum-broadened LSF parameter of the primary channel signal.

In the decoding method, the quantized LSF parameter of the secondary channel signal can be determined based on the prediction residual of the secondary channel signal and the quantized LSF parameter of the primary channel signal. Therefore, the quantized LSF parameter of the secondary channel signal may not need to be recorded in the bitstream, but the prediction residual of the secondary channel signal is recorded. This helps reduce a quantity of bits required for encoding.

With reference to the second aspect, in a first possible implementation, performing spectrum broadening on the quantized LSF parameter of the primary channel signal in the current frame in the stereo signal, to obtain a spectrum-broadened LSF parameter of the primary channel signal includes performing pull-to-average processing on the quantized LSF parameter of the primary channel signal to obtain the spectrum-broadened LSF parameter of the primary channel signal, where the pull-to-average processing is performed according to the following formula:

$$LSF_{SB}(i) = \beta \cdot LSF_P(i) + (1-\beta) \cdot \overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of an original LSF parameter of the secondary channel signal, 1≤i≤M, i is an integer, and M represents a linear prediction parameter.

With reference to the second aspect, in a second possible implementation, performing spectrum broadening on a quantized LSF parameter of a primary channel signal in a current frame in a stereo signal, to obtain a spectrum-broadened LSF parameter of the primary channel signal includes converting the quantized LSF parameter of the primary channel signal into a LPC, modifying the LPC to obtain a modified LPC of the primary channel signal, and converting the modified LPC of the primary channel signal into an LSF parameter, where the LSF parameter obtained through conversion is the spectrum-broadened LSF parameter of the primary channel signal.

With reference to the second aspect or the first or second possible implementation, in a third possible implementation, the quantized LSF parameter of the secondary channel signal is a sum of the spectrum-broadened LSF parameter and the prediction residual.

With reference to the second aspect or the first or second possible implementation, in a fourth possible implementation, determining a quantized LSF parameter of the secondary channel signal based on the prediction residual of the LSF parameter of the secondary channel signal and the spectrum-broadened LSF parameter of the primary channel signal includes performing two-stage prediction on the LSF parameter of the secondary channel signal based on the spectrum-broadened LSF parameter of the primary channel signal to obtain a predicted LSF parameter, and using a sum of the predicted LSF parameter and the prediction residual as the quantized LSF parameter of the secondary channel signal.

According to a third aspect, a stereo signal encoding apparatus is provided. The encoding apparatus includes modules configured to perform the encoding method according to any one of the first aspect or the possible implementations of the first aspect.

According to a fourth aspect, a stereo signal decoding apparatus is provided. The decoding apparatus includes modules configured to perform the method according to any one of the second aspect or the possible implementations of the second aspect.

According to a fifth aspect, a stereo signal encoding apparatus is provided. The encoding apparatus includes a memory and a processor. The memory is configured to store a program. The processor is configured to execute the program. When executing the program in the memory, the processor implements the encoding method according to any one of the first aspect or the possible implementations of the first aspect.

According to a sixth aspect, a stereo signal decoding apparatus is provided. The decoding apparatus includes a memory and a processor. The memory is configured to store a program. The processor is configured to execute the program. When executing the program in the memory, the processor implements the decoding method according to any one of the second aspect or the possible implementations of the second aspect.

According to a seventh aspect, a computer-readable storage medium is provided. The computer-readable storage medium stores program code to be executed by an apparatus or a device, and the program code includes an instruction used to implement the encoding method according to any one of the first aspect or the possible implementations of the first aspect.

According to an eighth aspect, a computer-readable storage medium is provided. The computer-readable storage medium stores program code to be executed by an apparatus or a device, and the program code includes an instruction used to implement the decoding method according to any one of the second aspect or the possible implementations of the second aspect.

According to a ninth aspect, a chip is provided. The chip includes a processor and a communications interface. The communications interface is configured to communicate with an external device. The processor is configured to implement the encoding method according to any one of the first aspect or the possible implementations of the first aspect.

Optionally, the chip may further include a memory. The memory stores an instruction. The processor is configured to execute the instruction stored in the memory. When the instruction is executed, the processor is configured to implement the encoding method according to any one of the first aspect or the possible implementations of the first aspect.

Optionally, the chip may be integrated into a terminal device or a network device.

According to a tenth aspect, a chip is provided. The chip includes a processor and a communications interface. The communications interface is configured to communicate with an external device. The processor is configured to implement the decoding method according to any one of the second aspect or the possible implementations of the second aspect.

Optionally, the chip may further include a memory. The memory stores an instruction. The processor is configured to execute the instruction stored in the memory. When the instruction is executed, the processor is configured to implement the decoding method according to any one of the second aspect or the possible implementations of the second aspect.

Optionally, the chip may be integrated into a terminal device or a network device.

According to an eleventh aspect, an embodiment of this disclosure provides a computer program product including an instruction. When the computer program product is run on a computer, the computer is enabled to perform the encoding method according to the first aspect.

According to a twelfth aspect, an embodiment of this disclosure provides a computer program product including an instruction. When the computer program product is run on a computer, the computer is enabled to perform the decoding method according to the second aspect.

DESCRIPTION OF EMBODIMENTS

Figure 1:
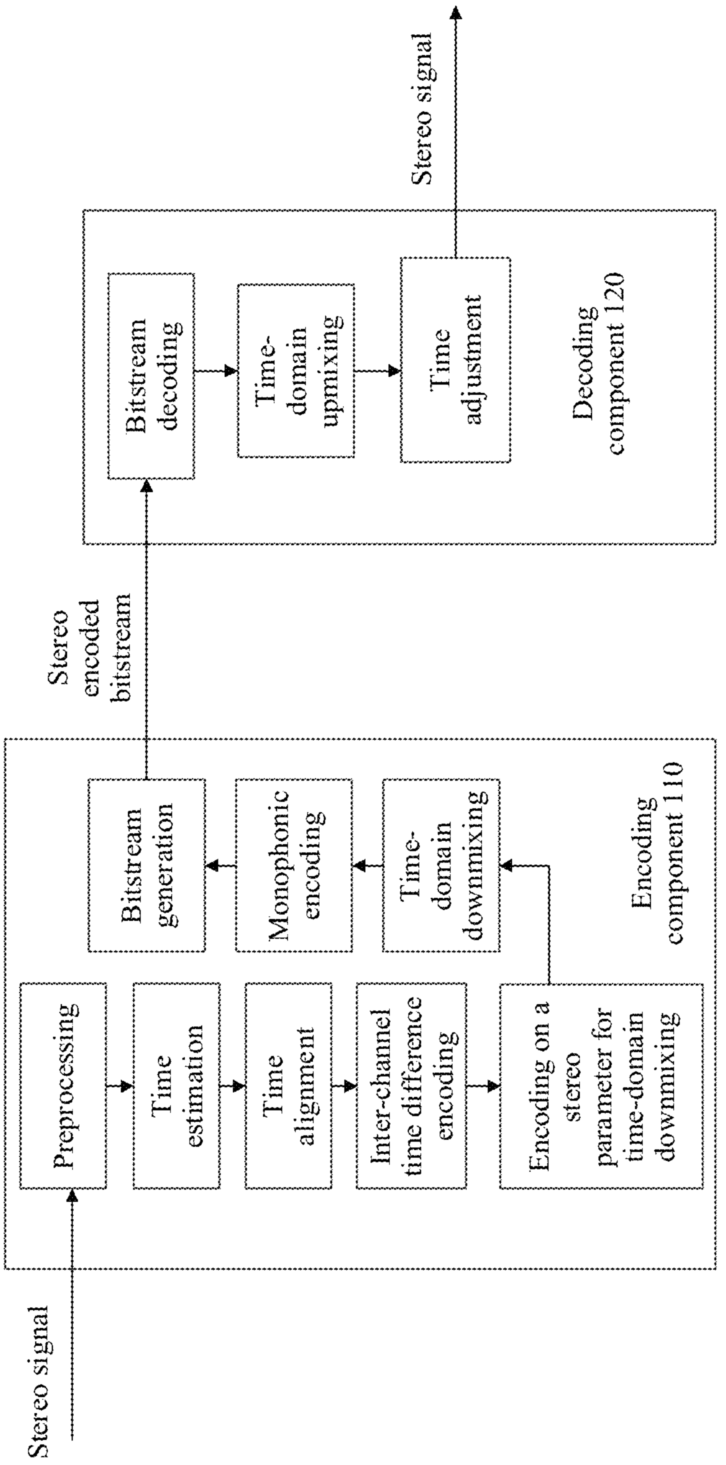
FIG. 1 is a schematic structural diagram of a stereo encoding and decoding system in time domain according to an embodiment of this disclosure.

FIG. 1 is a schematic structural diagram of a stereo encoding and decoding system in time domain according to an example embodiment of this disclosure. The stereo encoding and decoding system includes an encoding component 110 and a decoding component 120.

It should be understood that a stereo signal in this disclosure may be an original stereo signal, may be a stereo signal including two signals included in signals on a plurality of channels, or may be a stereo signal including two signals jointly generated from a plurality of signals included in signals on a plurality of channels.

The encoding component 110 is configured to encode the stereo signal in time domain. Optionally, the encoding component 110 may be implemented in a form of software, hardware, or a combination of software and hardware. This is not limited in the embodiments of this disclosure.

That the encoding component 110 encodes the stereo signal in time domain may include the following steps.

(1) Perform time-domain preprocessing on the obtained stereo signal to obtain a time-domain preprocessed left-channel signal and a time-domain preprocessed right-channel signal.

The stereo signal may be collected by a collection component and sent to the encoding component 110. Optionally, the collection component and the encoding component 110 may be disposed in a same device. Alternatively, the collection component and the encoding component 110 may be disposed in different devices.

The time-domain preprocessed left-channel signal and the time-domain preprocessed right-channel signal are signals on two channels in a preprocessed stereo signal.

Optionally, the time-domain preprocessing may include at least one of high-pass filtering processing, pre-emphasis processing, sample rate conversion, and channel switching. This is not limited in the embodiments of this disclosure.

(2) Perform time estimation based on the time-domain preprocessed left-channel signal and the time-domain preprocessed right-channel signal, to obtain an inter-channel time difference between the time-domain preprocessed left-channel signal and the time-domain preprocessed right-channel signal.

For example, a cross-correlation function between a left-channel signal and a right-channel signal may be calculated based on the time-domain preprocessed left-channel signal and the time-domain preprocessed right-channel signal. Then, a maximum value of the cross-correlation function is searched for, and the maximum value is used as the inter-channel time difference between the time-domain preprocessed left-channel signal and the time-domain preprocessed right-channel signal.

For another example, a cross-correlation function between a left-channel signal and a right-channel signal may be calculated based on the time-domain preprocessed left-channel signal and the time-domain preprocessed right-channel signal. Then, long-time smoothing is performed on a cross-correlation function between a left-channel signal and a right-channel signal in a current frame based on a cross-correlation function between a left-channel signal and a right-channel signal in each of previous L frames (L is an integer greater than or equal to 1) of the current frame, to obtain a smoothed cross-correlation function. Subsequently, a maximum value of the smoothed cross-correlation function is searched for, and an index value corresponding to the maximum value is used as an inter-channel time difference between a time-domain preprocessed left-channel signal and a time-domain preprocessed right-channel signal in the current frame.

For another example, inter-frame smoothing may be performed on an estimated inter-channel time difference in a current frame based on inter-channel time differences in previous M frames (M is an integer greater than or equal to 1) of the current frame, and a smoothed inter-channel time difference is used as a final inter-channel time difference between a time-domain preprocessed left-channel signal and a time-domain preprocessed right-channel signal in the current frame.

It should be understood that the foregoing inter-channel time difference estimation method is merely an example, and the embodiments of this disclosure are not limited to the foregoing inter-channel time difference estimation method.

(3) Perform time alignment on the time-domain preprocessed left-channel signal and the time-domain preprocessed right-channel signal based on the inter-channel time difference, to obtain a time-aligned left-channel signal and a time-aligned right-channel signal.

For example, one or two signals in the left-channel signal and the right-channel signal in the current frame may be compressed or pulled based on the estimated inter-channel time difference in the current frame and an inter-channel time difference in a previous frame such that no inter-channel time difference exists between the time-aligned left-channel signal and the time-aligned right-channel signal.

(4) Encode the inter-channel time difference to obtain an encoding index of the inter-channel time difference.

(5) Calculate a stereo parameter for time-domain downmixing, and encode the stereo parameter for time-domain downmixing to obtain an encoding index of the stereo parameter for time-domain downmixing.

The stereo parameter for time-domain downmixing is used to perform time-domain downmixing on the time-aligned left-channel signal and the time-aligned right-channel signal.

(6) Perform time-domain downmixing on the time-aligned left-channel signal and the time-aligned right-channel signal based on the stereo parameter for time-domain downmixing, to obtain a primary channel signal and a secondary channel signal.

The primary channel signal is used to represent related information between channels, and may also be referred to as a downmixed signal or a center channel signal. The secondary channel signal is used to represent difference information between channels, and may also be referred to as a residual signal or a side channel signal.

When the time-aligned left-channel signal and the time-aligned right-channel signal are aligned in time domain, the secondary channel signal is the weakest. In this case, the stereo signal has the best effect.

(7) Separately encode the primary channel signal and the secondary channel signal to obtain a first monophonic encoded bitstream corresponding to the primary channel signal and a second monophonic encoded bitstream corresponding to the secondary channel signal.

(8) Write the encoding index of the inter-channel time difference, the encoding index of the stereo parameter, the first monophonic encoded bitstream, and the second monophonic encoded bitstream into a stereo encoded bitstream.

It should be noted that not all of the foregoing steps are mandatory. For example, step (1) is not mandatory. If there is no step (1), the left-channel signal and the right-channel signal used for time estimation may be a left-channel signal and a right-channel signal in an original stereo signal. Herein, the left-channel signal and the right-channel signal in the original stereo signal are signals obtained after collection and analog-to-digital (A/D) conversion.

The decoding component 120 is configured to decode the stereo encoded bitstream generated by the encoding component 110, to obtain the stereo signal.

Optionally, the encoding component 110 may be connected to the decoding component 120 in a wired or wireless manner, and the decoding component 120 may obtain, through a connection between the decoding component 120 and the encoding component 110, the stereo encoded bitstream generated by the encoding component 110. Alternatively, the encoding component 110 may store the generated stereo encoded bitstream in a memory, and the decoding component 120 reads the stereo encoded bitstream in the memory.

Optionally, the decoding component 120 may be implemented in a form of software, hardware, or a combination of software and hardware. This is not limited in the embodiments of this disclosure.

A process in which the decoding component 120 decodes the stereo encoded bitstream to obtain the stereo signal may include the following steps.

(1) Decode the first monophonic encoded bitstream and the second monophonic encoded bitstream in the stereo encoded bitstream to obtain the primary channel signal and the secondary channel signal.

(2) Obtain an encoding index of a stereo parameter for time-domain upmixing based on the stereo encoded bitstream, and perform time-domain upmixing on the primary channel signal and the secondary channel signal to obtain a time-domain upmixed left-channel signal and a time-domain upmixed right-channel signal.

(3) Obtain the encoding index of the inter-channel time difference based on the stereo encoded bitstream, and perform time adjustment on the time-domain upmixed left-channel signal and the time-domain upmixed right-channel signal, to obtain the stereo signal.

Optionally, the encoding component 110 and the decoding component 120 may be disposed in a same device, or may be disposed in different devices. The device may be a mobile terminal that has an audio signal processing function, such as a mobile phone, a tablet computer, a laptop portable computer, a desktop computer, a BLUETOOTH sound box, a recording pen, or a wearable device, or may be a network element that has an audio signal processing capability in a core network or a wireless network. This is not limited in the embodiments of this disclosure.

Figure 2:
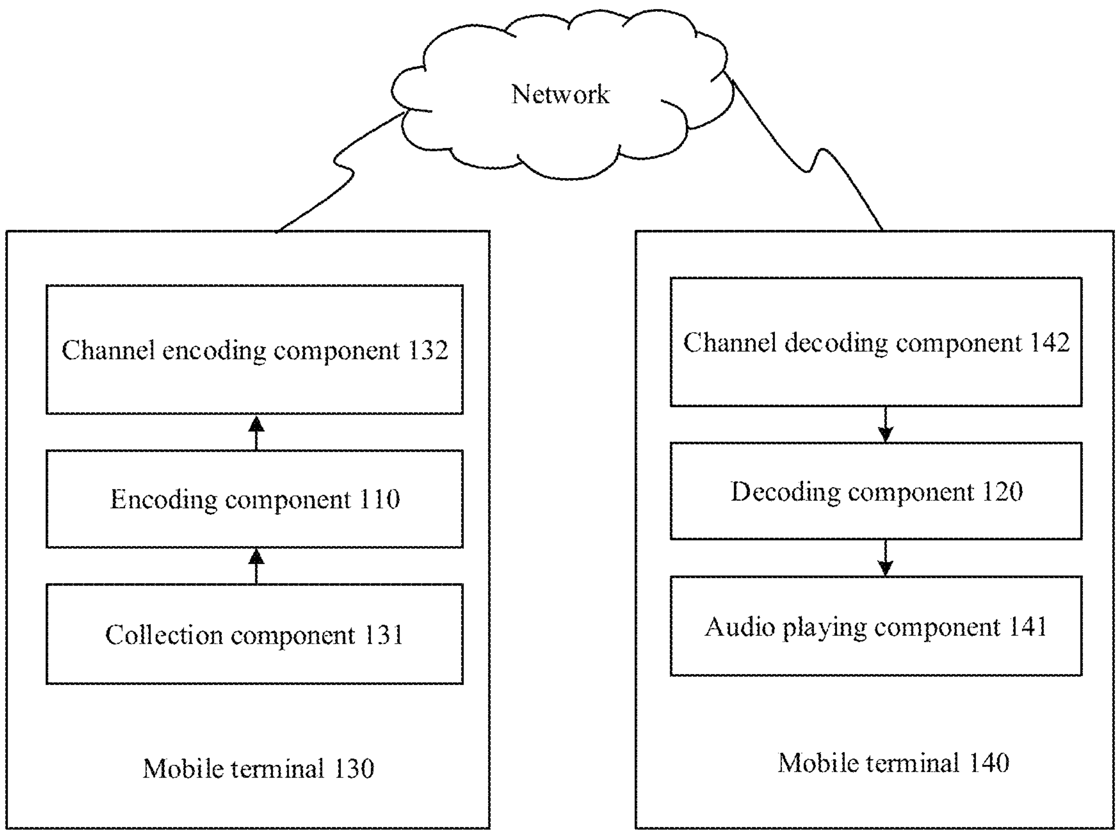
FIG. 2 is a schematic diagram of a mobile terminal according to an embodiment of this disclosure.

For example, as shown in FIG. 2, descriptions are provided using the following example. The encoding component 110 is disposed in a mobile terminal 130. The decoding component 120 is disposed in a mobile terminal 140. The mobile terminal 130 and the mobile terminal 140 are electronic devices that are independent of each other and that have an audio signal processing capability. For example, the mobile terminal 130 and the mobile terminal 140 each may be a mobile phone, a wearable device, a virtual reality (VR) device, an augmented reality (AR) device, or the like. In addition, the mobile terminal 130 is connected to the mobile terminal 140 through a wireless or wired network.

Optionally, the mobile terminal 130 may include a collection component 131, the encoding component 110, and a channel encoding component 132. The collection component 131 is connected to the encoding component 110, and the encoding component 110 is connected to the encoding component 132.

Optionally, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting a stereo signal using the collection component 131, the mobile terminal 130 encodes the stereo signal using the encoding component 110, to obtain a stereo encoded bitstream. Then, the mobile terminal 130 encodes the stereo encoded bitstream using the channel encoding component 132 to obtain a transmission signal.

The mobile terminal 130 sends the transmission signal to the mobile terminal 140 through the wireless or wired network.

After receiving the transmission signal, the mobile terminal 140 decodes the transmission signal using the channel decoding component 142 to obtain the stereo encoded bitstream, decodes the stereo encoded bitstream using the decoding component 120 to obtain the stereo signal, and plays the stereo signal using the audio playing component 141.

Figure 3:
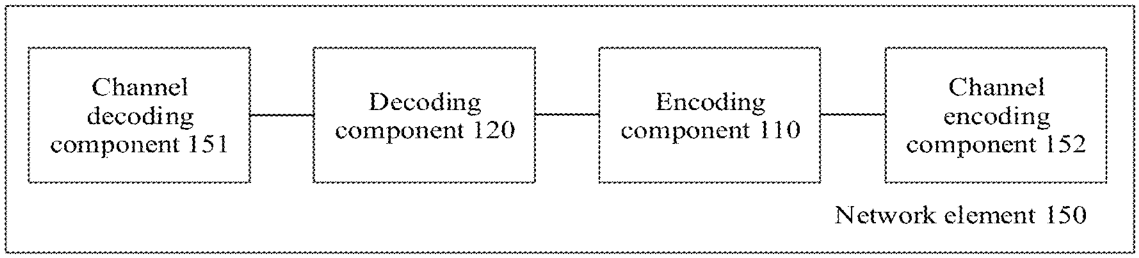
FIG. 3 is a schematic diagram of a network element according to an embodiment of this disclosure.

For example, as shown in FIG. 3, an example in which the encoding component 110 and the decoding component 120 are disposed in a same network element 150 having an audio signal processing capability in a core network or a wireless network is used for description in this embodiment of this disclosure.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a transmission signal sent by another device, the channel decoding component 151 decodes the transmission signal to obtain a first stereo encoded bitstream. The decoding component 120 decodes the stereo encoded bitstream to obtain a stereo signal. The encoding component 110 encodes the stereo signal to obtain a second stereo encoded bitstream. The channel encoding component 152 encodes the second stereo encoded bitstream to obtain the transmission signal.

The other device may be a mobile terminal that has an audio signal processing capability, or may be another network element that has an audio signal processing capability. This is not limited in the embodiments of this disclosure.

Optionally, the encoding component 110 and the decoding component 120 in the network element may transcode a stereo encoded bitstream sent by the mobile terminal.

Optionally, in the embodiments of this disclosure, a device on which the encoding component 110 is installed may be referred to as an audio encoding device. During actual implementation, the audio encoding device may also have an audio decoding function. This is not limited in the embodiments of this disclosure.

Optionally, in the embodiments of this disclosure, only the stereo signal is used as an example for description. In this disclosure, the audio encoding device may further process a multi-channel signal, and the multi-channel signal includes at least two channel signals.

The encoding component 110 may encode the primary channel signal and the secondary channel signal using an algebraic code-excited linear prediction (ACELP) encoding method.

The ACELP encoding method usually includes determining an LPC coefficient of the primary channel signal and an LPC coefficient of the secondary channel signal, converting each of the LPC coefficient of the primary channel signal and the LPC coefficient of the secondary channel signal into an LSF parameter, and performing quantization on the LSF parameter of the primary channel signal and the LSF parameter of the secondary channel signal, searching adaptive code excitation to determine a pitch period and an adaptive codebook gain, and separately performing quantization on the pitch period and the adaptive codebook gain, searching algebraic code excitation to determine a pulse index and a gain of the algebraic code excitation, and separately performing quantization on the pulse index and the gain of the algebraic code excitation.

Figure 4:
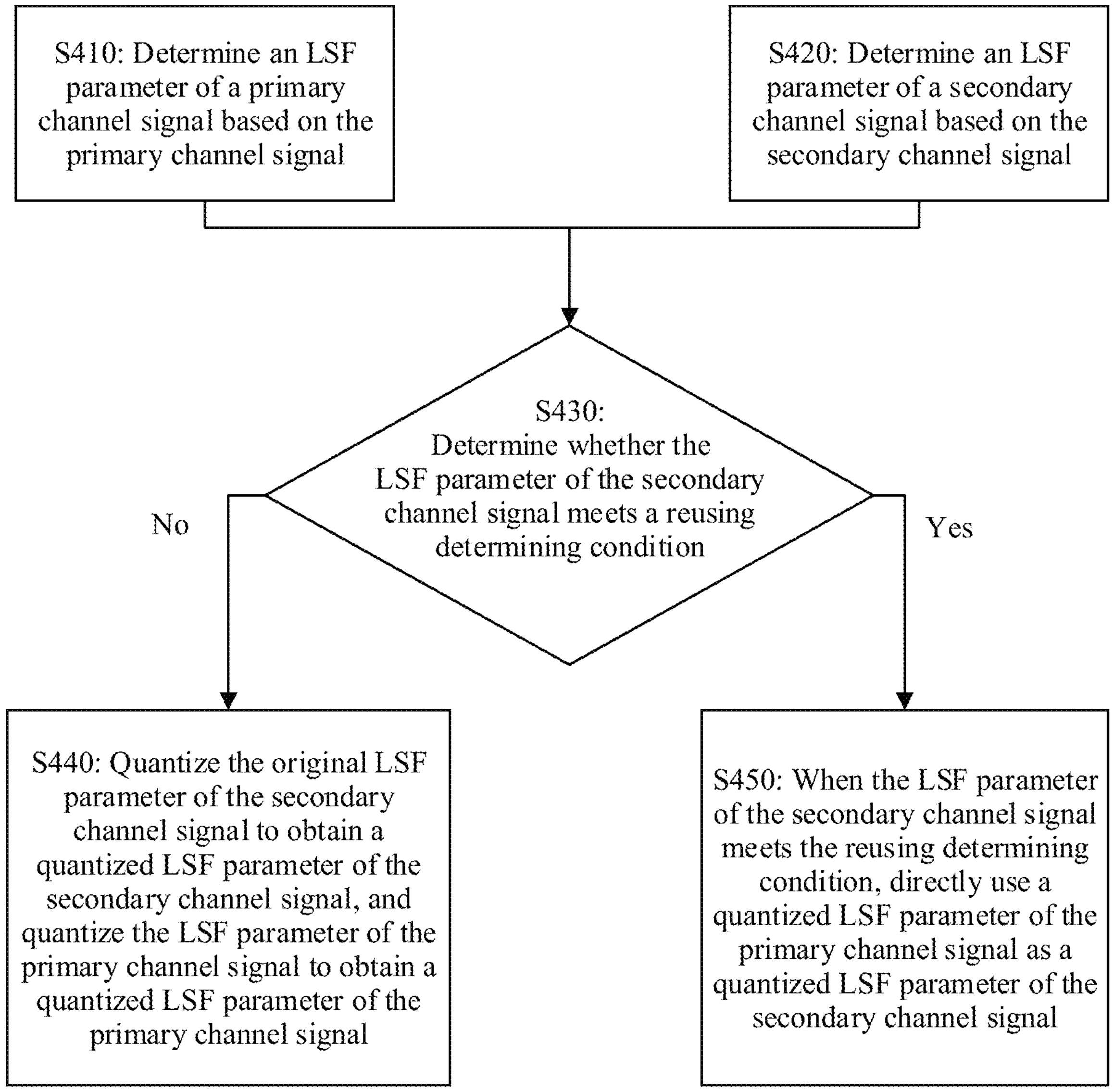
FIG. 4 is a schematic flowchart of a method for performing quantization on an LSF parameter of a primary channel signal and an LSF parameter of a secondary channel signal.

FIG. 4 shows an example method in which the encoding component 110 performs quantization on the LSF parameter of the primary channel signal and the LSF parameter of the secondary channel signal.

S410: Determine an original LSF parameter of the primary channel signal based on the primary channel signal.

S420: Determine an original LSF parameter of the secondary channel signal based on the secondary channel signal.

There is no execution sequence between step S410 and step S420.

S430: Determine, based on the original LSF parameter of the primary channel signal and the original LSF parameter of the secondary channel signal, whether the LSF parameter of the secondary channel signal meets a reusing determining condition. The reusing determining condition may also be referred to as a reusing condition for short.

If the LSF parameter of the secondary channel signal does not meet the reusing determining condition, step S440 is performed. If the LSF parameter of the secondary channel signal meets the reusing determining condition, step S450 is performed.

Reusing means that a quantized LSF parameter of the secondary channel signal may be obtained based on a quantized LSF parameter of the primary channel signal. For example, the quantized LSF parameter of the primary channel signal is used as the quantized LSF parameter of the secondary channel signal. In other words, the quantized LSF parameter of the primary channel signal is reused as the quantized LSF parameter of the secondary channel signal.

Determining whether the LSF parameter of the secondary channel signal meets the reusing determining condition may be referred to as performing reusing determining on the LSF parameter of the secondary channel signal.

For example, when the reusing determining condition is that a distance between the original LSF parameter of the primary channel signal and the original LSF parameter of the secondary channel signal is less than or equal to a preset threshold, if the distance between the original LSF parameter of the primary channel signal and the original LSF parameter of the secondary channel signal is greater than the preset threshold, it is determined that the LSF parameter of the secondary channel signal does not meet the reusing determining condition, or if the distance between the original LSF parameter of the primary channel signal and the original LSF parameter of the secondary channel signal is less than or equal to the preset threshold, it may be determined that the LSF parameter of the secondary channel signal meets the reusing determining condition.

It should be understood that the determining condition used in the foregoing reusing determining is merely an example, and this is not limited in this disclosure.

The distance between the LSF parameter of the primary channel signal and the LSF parameter of the secondary channel signal may be used to represent a difference between the LSF parameter of the primary channel signal and the LSF parameter of the secondary channel signal.

The distance between the LSF parameter of the primary channel signal and the LSF parameter of the secondary channel signal may be calculated in a plurality of manners.

For example, the distance $$WD_n^2$$

between the LSF parameter of the primary channel signal and the LSF parameter of the secondary channel signal may be calculated according to the following formula:

$$WD_n^2 = \sum_{i=1}^{M} w_i\,[LSF_S(i) - LSF_p(i)]^2.$$

Herein, $LSF_P(i)$ is an LSF parameter vector of the primary channel signal, $LSF_S$ is an LSF parameter vector of the secondary channel signal, i is a vector index, i=1, . . . , or M, M is a linear prediction order, and $w_i$ is an $i^{th}$ weighting coefficient.

$$WD_n^2$$

may also be referred to as a weighted distance. The foregoing formula is merely an example method for calculating the distance between the LSF parameter of the primary channel signal and the LSF parameter of the secondary channel signal, and the distance between the LSF parameter of the primary channel signal and the LSF parameter of the secondary channel signal may be alternatively calculated using another method. For example, the weighting coefficient in the foregoing formula may be removed, or subtraction may be performed on the LSF parameter of the primary channel signal and the LSF parameter of the secondary channel signal.

Performing reusing determining on the original LSF parameter of the secondary channel signal may also be referred to as performing quantization determining on the LSF parameter of the secondary channel signal. If a determining result is to quantize the LSF parameter of the secondary channel signal, the original LSF parameter of the secondary channel signal may be quantized and written into a bitstream, to obtain the quantized LSF parameter of the secondary channel signal.

The determining result in this step may be written into the bitstream, to transmit the determining result to a decoder side.

S440: Quantize the original LSF parameter of the secondary channel signal to obtain the quantized LSF parameter of the secondary channel signal, and quantize the LSF parameter of the primary channel signal to obtain the quantized LSF parameter of the primary channel signal.

It should be understood that, when the LSF parameter of the secondary channel signal meets the reusing determining condition, directly using the quantized LSF parameter of the primary channel signal as the quantized LSF parameter of the secondary channel signal is merely an example. Certainly, the quantized LSF parameter of the primary channel signal may be reused using another method, to obtain the quantized LSF parameter of the secondary channel signal. This is not limited in this embodiment of this disclosure.

S450: When the LSF parameter of the secondary channel signal meets the reusing determining condition, directly use the quantized LSF parameter of the primary channel signal as the quantized LSF parameter of the secondary channel signal.

The original LSF parameter of the primary channel signal and the original LSF parameter of the secondary channel signal are separately quantized and written into the bitstream, to obtain the quantized LSF parameter of the primary channel signal and the quantized LSF parameter of the secondary channel signal. In this case, a relatively large quantity of bits are occupied.

Figure 5:
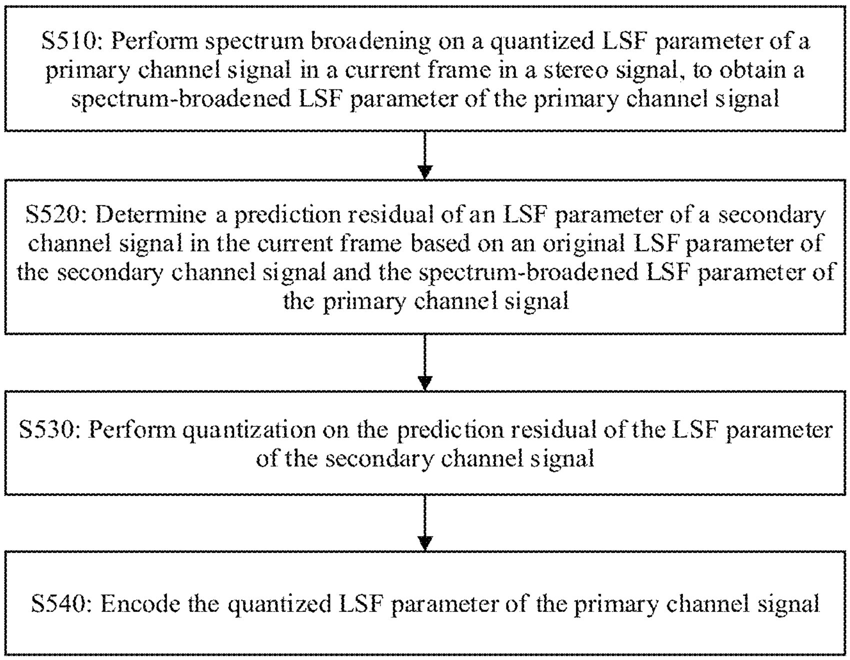
FIG. 5 is a schematic flowchart of a stereo signal encoding method according to an embodiment of this disclosure.

FIG. 5 is a schematic flowchart of a stereo signal encoding method according to an embodiment of this disclosure. When learning that a reusing determining result is that a reusing determining condition is not met, the encoding component 110 may perform the method shown in FIG. 5.

S510: Perform spectrum broadening on a quantized LSF parameter of a primary channel signal in a current frame in a stereo signal, to obtain a spectrum-broadened LSF parameter of the primary channel signal.

S520: Determine a prediction residual of an LSF parameter of a secondary channel signal in the current frame based on an original LSF parameter of the secondary channel signal and the spectrum-broadened LSF parameter of the primary channel signal.

Figure 15:
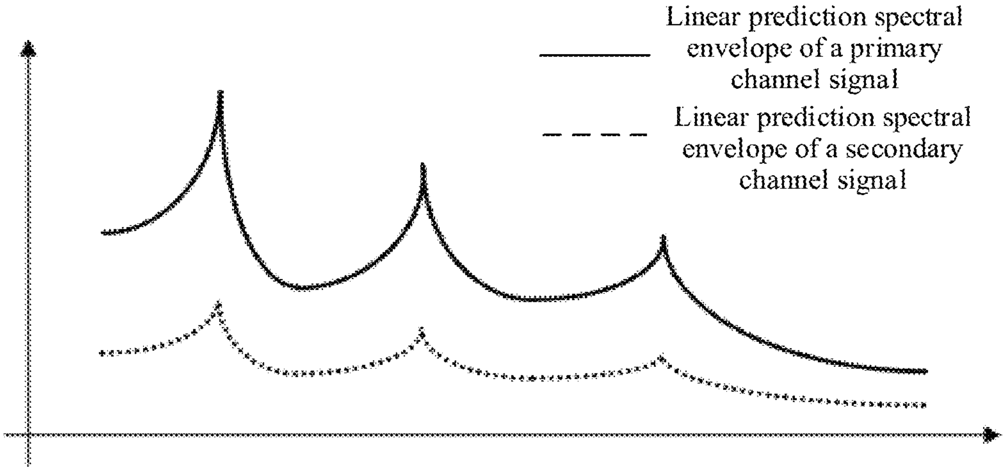
FIG. 15 is a schematic diagram of linear prediction spectral envelopes of a primary channel signal and a secondary channel signal.

As shown in FIG. 15, there is a similarity between a linear prediction spectral envelope of the primary channel signal and a linear prediction spectral envelope of the secondary channel signal. A linear prediction spectral envelope is represented by an LPC coefficient, and the LPC coefficient may be converted into an LSF parameter. Therefore, there is a similarity between the LSF parameter of the primary channel signal and the LSF parameter of the secondary channel signal. Thus, determining the prediction residual of the LSF parameter of the secondary channel signal based on the spectrum-broadened LSF parameter of the primary channel signal helps improve accuracy of the prediction residual.

The original LSF parameter of the secondary channel signal may be understood as an LSF parameter obtained based on the secondary channel signal using a method in the other approaches, for example, the original LSF parameter obtained in S420.

Determining the prediction residual of the LSF parameter of the secondary channel signal based on the original LSF parameter of the secondary channel signal and a predicted LSF parameter of the secondary channel signal may include using a difference between the original LSF parameter of the secondary channel signal and the predicted LSF parameter of the secondary channel signal as the prediction residual of the LSF parameter of the secondary channel signal.

S530: Perform quantization on the prediction residual of the LSF parameter of the secondary channel signal.

S540: Perform quantization on the quantized LSF parameter of the primary channel signal.

In the encoding method in this embodiment of this disclosure, when the LSF parameter of the secondary channel signal needs to be encoded, quantization is performed on the prediction residual of the LSF parameter of the secondary channel signal. Compared with a method in which the LSF parameter of the secondary channel signal is separately encoded, this method helps reduce a quantity of bits required for encoding.

In addition, because the LSF parameter that is of the secondary channel signal and that is used to determine the prediction residual is obtained through prediction based on the LSF parameter obtained after spectrum broadening is performed on the quantized LSF parameter of the primary channel signal, a similarity feature between the linear prediction spectral envelope of the primary channel signal and the linear prediction spectral envelope of the secondary channel signal can be used. This helps improve accuracy of the prediction residual relative to the quantized LSF parameter of the primary channel signal, and helps improve accuracy of determining, by a decoder side, a quantized LSF parameter of the secondary channel signal based on the prediction residual and the quantized LSF parameter of the primary channel signal.

S510, S520, and S530 may be implemented in a plurality of manners. The following provides descriptions with reference to FIG. 6 to FIG. 9.

Figure 6:
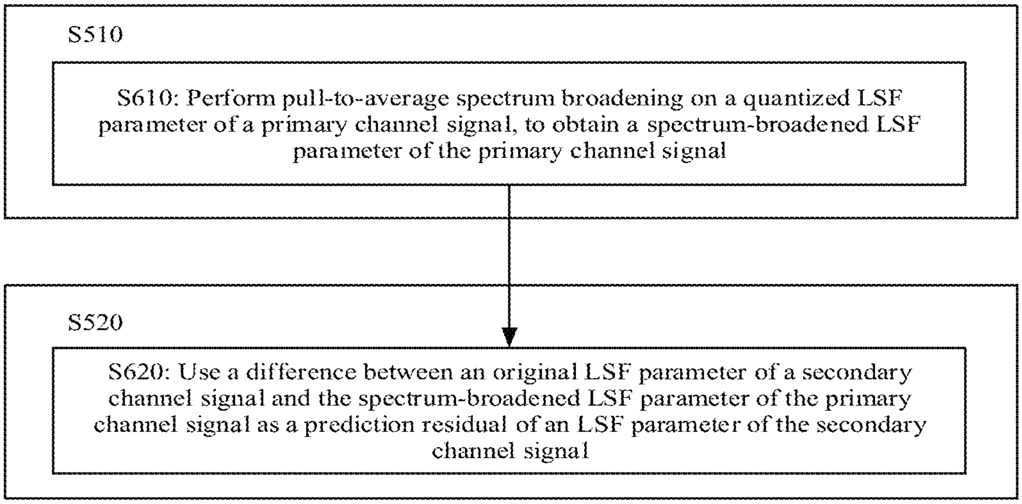
FIG. 6 is a schematic flowchart of a stereo signal encoding method according to an embodiment of this disclosure.

As shown in FIG. 6, S510 may include S610, and S520 may include S620.

S610: Perform pull-to-average spectrum broadening on the quantized LSF parameter of the primary channel signal, to obtain the spectrum-broadened LSF parameter of the primary channel signal.

The foregoing pull-to-average processing may be performed according to the following formula:

$$LSF_{SB}(i)=\beta\cdot LSF_P(i)+(1-\beta)\cdot\overline{LSF_S}(i).$$

Herein, $LSF_{SB}$ is a spectrum-broadened LSF parameter vector of the primary channel signal, β is a broadening factor (broadening factor), $LSF_P$ is a quantized LSF parameter vector of the primary channel signal, $\overline{LSF_S}$ is a mean vector of the LSF parameter of the secondary channel signal, i is a vector index, i=1, . . . , or M, and M is a linear prediction order.

Usually, different linear prediction orders may be used for different encoding bandwidths. For example, when an encoding bandwidth is 16 kilohertz (kHz), 20-order linear prediction may be performed, that is, M=20. When an encoding bandwidth is 12.8 KHz, 16-order linear prediction may be performed, that is, M=16. An LSF parameter vector may also be briefly referred to as an LSF parameter.

The broadening factor β may be a preset constant. For example, β may be a preset constant real number greater than 0 and less than 1. For example, β=0.82, or β=0.91.

Alternatively, the broadening factor β may be adaptively obtained. For example, different broadening factors β may be preset based on encoding parameters such as different encoding modes, encoding bandwidths, or encoding rates, and then a corresponding broadening factor β is selected based on one or more current encoding parameters. The encoding mode described herein may include a voice activation detection result, unvoiced speech and voiced speech classification, and the like.

For example, the following corresponding broadening factors β may be set for different encoding rates:

$$\beta=\begin{cases}0.88, & brate\le 14000\\ 0.86, & brate=18000\\ 0.89, & brate=22000\\ 0.91, & brate=26000\\ 0.88, & brate\ge 34000\end{cases}.$$

Herein, brate represents an encoding rate.

Then, a broadening factor corresponding to an encoding rate in the current frame may be determined based on the encoding rate in the current frame and the foregoing correspondence between an encoding rate and a broadening factor.

The mean vector of the LSF parameter of the secondary channel signal may be obtained through training based on a large amount of data, may be a preset constant vector, or may be adaptively obtained.

For example, different mean vectors of the LSF parameter of the secondary channel signal may be preset based on encoding parameters such as encoding modes, encoding bandwidths, or encoding rates. Then, a mean vector corresponding to the LSF parameter of the secondary channel signal is selected based on an encoding parameter in the current frame.

S620: Use a difference between the original LSF parameter of the secondary channel signal and the spectrum-broadened LSF parameter of the primary channel signal as the prediction residual of the LSF parameter of the secondary channel signal.

Further, the prediction residual of the LSF parameter of the secondary channel signal satisfies the following formula:

$$E\_LSF_S(i) = LSF_S(i) - LSF_{SB}(i).$$

Herein, $E\_LSF_S$ is a prediction residual vector of the LSF parameter of the secondary channel signal, $LSF_S$ is an original LSF parameter vector of the secondary channel signal, $LSF_{SB}$ is a spectrum-broadened LSF parameter vector of the primary channel signal, i is a vector index, i=1, . . . , or M, and M is a linear prediction order. An LSF parameter vector may also be briefly referred to as an LSF parameter.

In other words, the spectrum-broadened LSF parameter of the primary channel signal is directly used as the predicted LSF parameter of the secondary channel signal (this implementation may be referred to as performing single-stage prediction on the LSF parameter of the secondary channel signal), and the difference between the original LSF parameter of the secondary channel signal and the predicted LSF parameter of the secondary channel signal is used as the prediction residual of the LSF parameter of the secondary channel signal.

Figure 7:
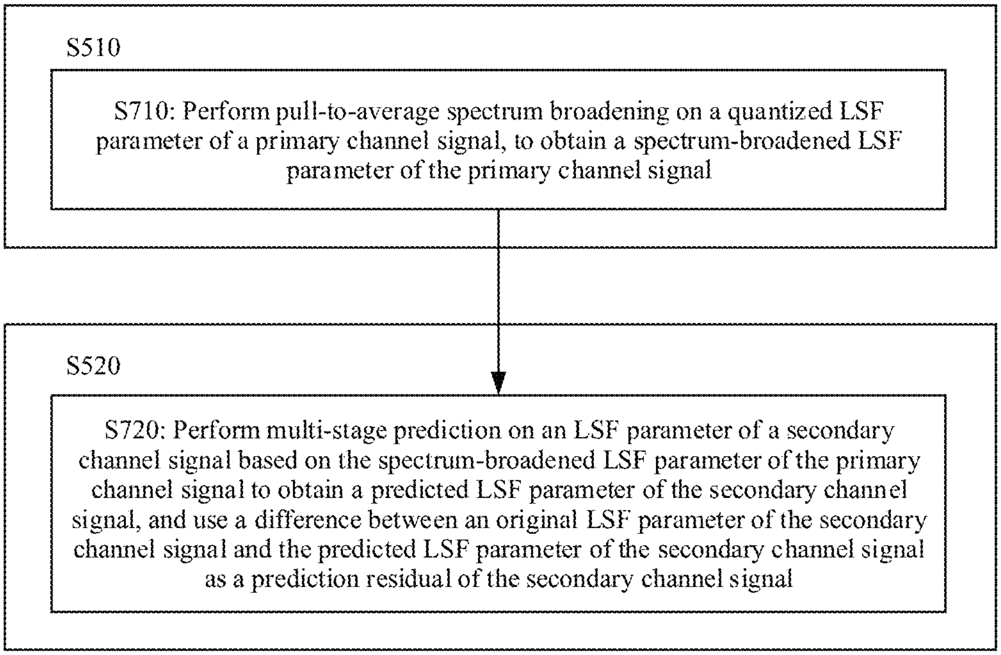
FIG. 7 is a schematic flowchart of a stereo signal encoding method according to an embodiment of this disclosure.

As shown in FIG. 7, S510 may include S710, and S520 may include S720.

S710: Perform pull-to-average spectrum broadening on the quantized LSF parameter of the primary channel signal, to obtain the spectrum-broadened LSF parameter of the primary channel signal.

For this step, refer to S610. Details are not described herein again.

S720: Perform multi-stage prediction on the LSF parameter of the secondary channel signal based on the spectrum-broadened LSF parameter of the primary channel signal to obtain the predicted LSF parameter of the secondary channel signal, and use the difference between the original LSF parameter of the secondary channel signal and the predicted LSF parameter of the secondary channel signal as the prediction residual of the secondary channel signal.

A specific quantity of times of prediction performed on the LSF parameter of the secondary channel signal may be referred to as a specific quantity of stages of prediction performed on the LSF parameter of the secondary channel signal.

The multi-stage prediction may include predicting the spectrum-broadened LSF parameter of the primary channel signal as the predicted LSF parameter of the secondary channel signal. This prediction may be referred to as intra prediction.

The intra prediction may be performed at any location of the multi-stage prediction. For example, the intra prediction (that is, stage-1 prediction) may be first performed, and then prediction (for example, stage-2 prediction and stage-3 prediction) other than the intra prediction is performed. Alternatively, prediction (that is, stage-1 prediction) other than the intra prediction may be first performed, and then the intra prediction (that is, stage-2 prediction) is performed. Certainly, prediction (that is, stage-3 prediction) other than the intra prediction may be further performed.

If two-stage prediction is performed on the LSF parameter of the secondary channel signal, and stage-1 prediction is the intra prediction, stage-2 prediction may be performed based on an intra prediction result of the LSF parameter of the secondary channel signal (that is, based on the spectrum-broadened LSF parameter of the primary channel signal), or may be performed based on the original LSF parameter of the secondary channel signal. For example, the stage-2 prediction may be performed on the LSF parameter of the secondary channel signal using an inter prediction method based on a quantized LSF parameter of a secondary channel signal in a previous frame and the original LSF parameter of the secondary channel signal in the current frame.

If two-stage prediction is performed on the LSF parameter of the secondary channel signal, stage-1 prediction is the intra prediction, and stage-2 prediction is performed based on the spectrum-broadened LSF parameter of the primary channel signal, the prediction residual of the LSF parameter of the secondary channel satisfies the following formulas:

$$E\_LSF_S(i) = LSF_S(i) - P\_LSF_S(i); \text{ and}$$

$$P\_LSF_S(i) = Pre\{LSF_{SB}(i)\}.$$

Herein, $E\_LSF_S$ is a prediction residual vector of the LSF parameter of the secondary channel signal, $LSF_S$ is an original LSF parameter vector of the secondary channel signal, $LSF_{SB}$ is a spectrum-broadened LSF parameter vector of the primary channel signal, $P\_LSF_S$ is a predicted vector of the LSF parameter of the secondary channel signal, Pre $\{LSF_{SB}(i)\}$ is a predicted vector that is of the LSF parameter of the secondary channel signal and that is obtained after the stage-2 prediction is performed on the LSF parameter of the secondary channel based on the spectrum-broadened LSF parameter vector of the primary channel signal, i is a vector index, i=1, . . . , or M, and M is a linear prediction order. An LSF parameter vector may also be briefly referred to as an LSF parameter.

If two-stage prediction is performed on the LSF parameter of the secondary channel signal, stage-1 prediction is the intra prediction, and stage-2 prediction is performed based on an original LSF parameter vector of the secondary channel signal, the prediction residual of the LSF parameter of the secondary channel signal satisfies the following formulas:

$$E\_LSF_S(i) = LSF_S(i) - P\_LSF_S(i); \text{ and}$$

$$P\_LSF_S(i) = LSF_{SB}(i) + LSF'_S(i).$$

Herein, $E\_LSF_S$ is a prediction residual vector of the LSF parameter of the secondary channel signal, $LSF_S$ is the original LSF parameter vector of the secondary channel signal, $P\_LSF_S$ is a predicted vector of the LSF parameter of the secondary channel signal, $LSF_{SB}$ is a spectrum-broadened LSF parameter vector of the primary channel signal, $$LSF'_s$$

is a stage-2 predicted vector of the LSF parameter of the secondary channel, i is a vector index, i=1, . . . , or M, and M is a linear prediction order. An LSF parameter vector may also be briefly referred to as an LSF parameter.

Figure 8:
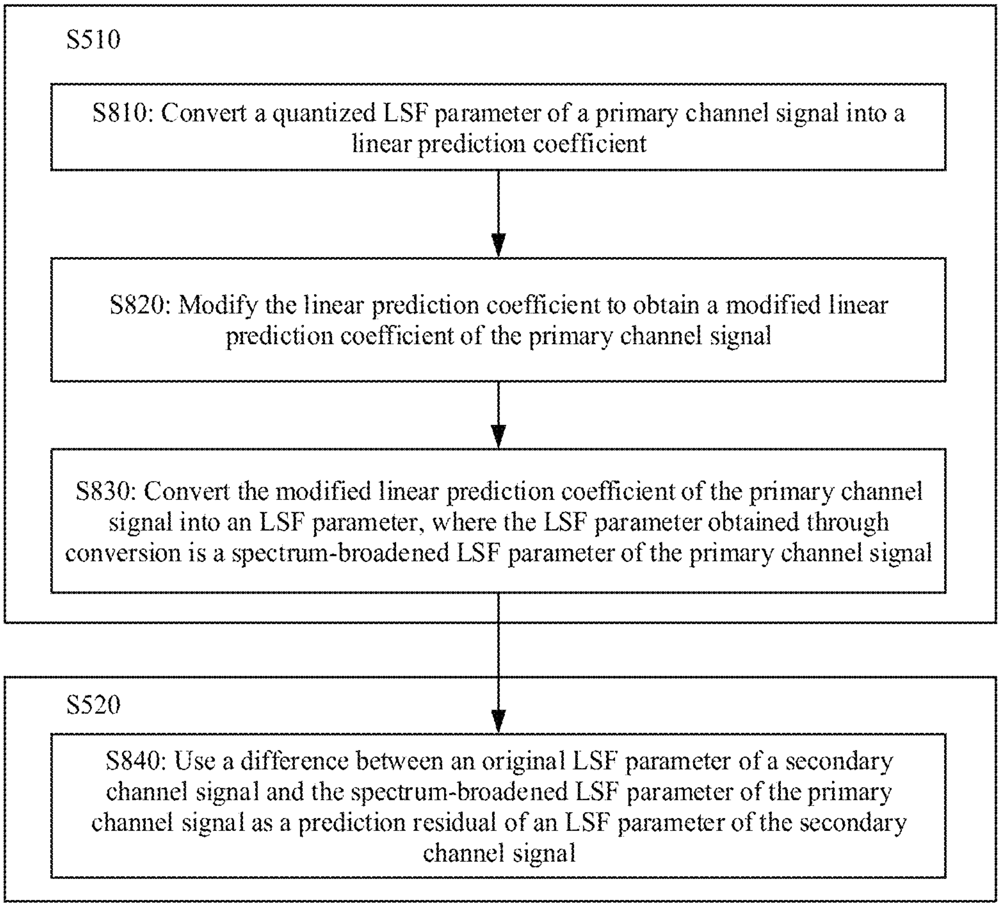
FIG. 8 is a schematic flowchart of a stereo signal encoding method according to an embodiment of this disclosure.

As shown in FIG. 8, S510 may include S810, S820, and S830, and S520 may include S840.

S810: Convert the quantized LSF parameter of the primary channel signal into an LPC.

For details of converting the LSF parameter into the LPC, refer to the other approaches. Details are not described herein. If the LPC obtained after converting the quantized LSF parameter of the primary channel signal into the LPC is denoted as $a_i$, and a transfer function used for conversion is denoted as A(z), the following formula is satisfied:

$$A(z) = \sum_{i=0}^{M} a_i z^{-1}, \text{ where } a_0 = 1.$$

Herein, $a_i$ is the LPC obtained after converting the quantized LSF parameter of the primary channel signal into the LPC, and M is a linear prediction order.

S820: Modify the LPC to obtain a modified LPC of the primary channel signal.

A transfer function of a modified linear predictor satisfies the following formula:

$$A\left(\frac{z}{\beta}\right) = \sum_{i=0}^{M} a_i \, (z/\beta)^{-i}, \text{ where } \alpha_0 = 1.$$

Herein, $a_i$ is the LPC obtained after converting the quantized LSF parameter of the primary channel signal into the LPC, β is a broadening factor, and M is a linear prediction order.

Spectrum-broadened LPC of the primary channel signal satisfies the following formula:

$$a_i' = a_i \beta^i, \text{ where } i = 1, \ldots, \text{ or } M; \text{ and}$$

$$\alpha_0' = 1.$$

Herein, $a_i$ is the LPC obtained after converting the quantized LSF parameter of the primary channel signal into the LPC, $$a_i'$$

is the spectrum-broadened LPC, β is a broadening factor, and M is a linear prediction order.

For a manner of obtaining the broadening factor β in this implementation, refer to the manner of obtaining the broadening factor β in S610. Details are not described herein again.

S830: Convert the modified LPC of the primary channel signal into an LSF parameter, where the LSF parameter obtained through conversion is the spectrum-broadened LSF parameter of the primary channel signal.

For a method for converting the LPC into the LSF parameter, refer to the other approaches. Details are not described herein. The spectrum-broadened LSF parameter of the primary channel signal may be denoted as $LSF_{SB}$.

S840: Use a difference between the original LSF parameter of the secondary channel signal and the spectrum-broadened LSF parameter of the primary channel signal as the prediction residual of the LSF parameter of the secondary channel signal.

For this step, refer to S620. Details are not described herein again.

Figure 9:
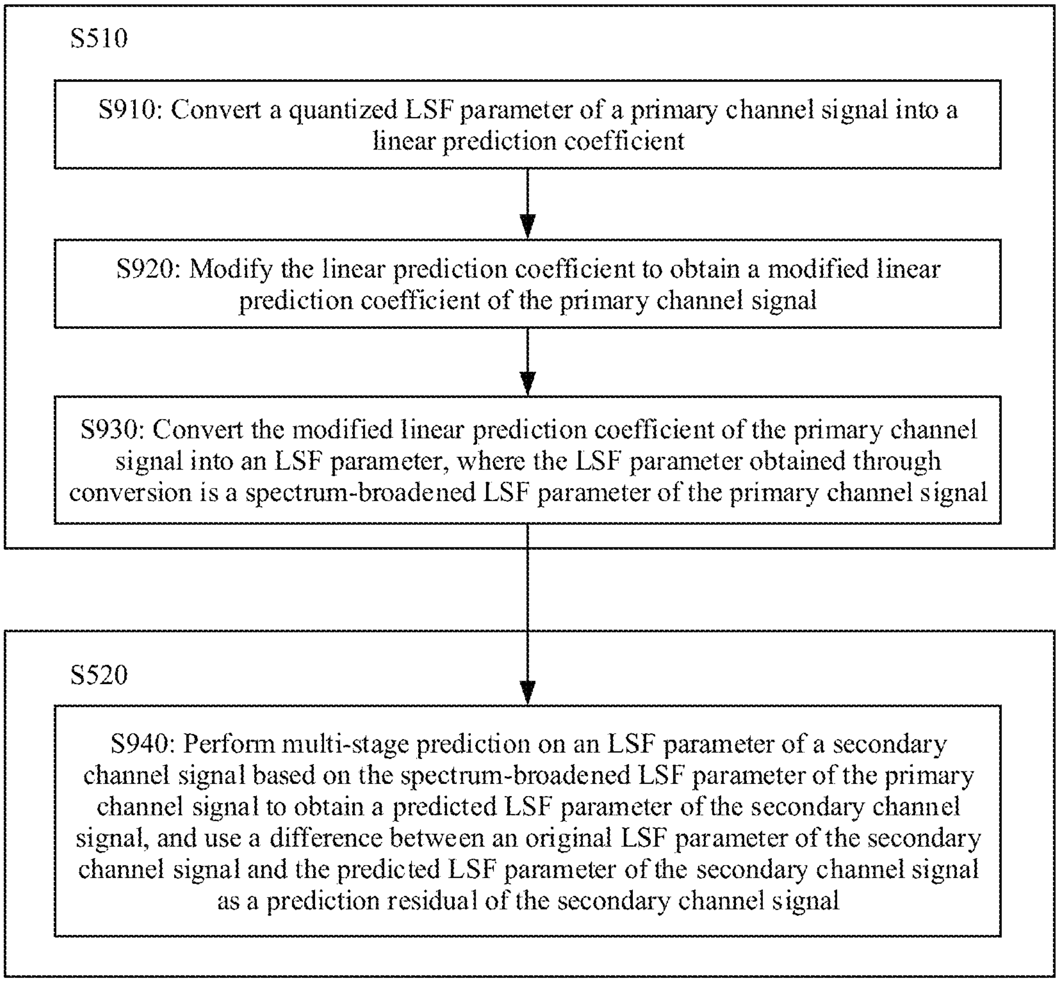
FIG. 9 is a schematic flowchart of a stereo signal encoding method according to an embodiment of this disclosure.

As shown in FIG. 9, S510 may include S910, S920, and S930, and S520 may include S940.

S910: Convert the quantized LSF parameter of the primary channel signal into an LPC.

For this step, refer to S810. Details are not described herein again.

S920: Modify the LPC to obtain a modified LPC of the primary channel signal.

For this step, refer to S820. Details are not described herein again.

S930: Convert the modified LPC of the primary channel signal into an LSF parameter, where the LSF parameter obtained through conversion is the spectrum-broadened LSF parameter of the primary channel signal.

For this step, refer to S830. Details are not described herein again.

S940: Perform multi-stage prediction on the LSF parameter of the secondary channel signal based on the spectrum-broadened LSF parameter of the primary channel signal to obtain the predicted LSF parameter of the secondary channel signal, and use the difference between the original LSF parameter of the secondary channel signal and the predicted LSF parameter of the secondary channel signal as the prediction residual of the secondary channel signal.

For this step, refer to S720. Details are not described herein again.

In S530 in this embodiment of this disclosure, when quantization is performed on the prediction residual of the LSF parameter of the secondary channel signal, reference may be made to any LSF parameter vector quantization method in the other approaches, for example, split vector quantization, multi-stage vector quantization, or safe-net vector quantization.

If a vector obtained after quantizing the prediction residual of the LSF parameter of the secondary channel signal is denoted as $\widehat{E\_LSF}_S$, the quantized LSF parameter of the secondary channel signal satisfies the following formula:

$$\widehat{LSF}_S(i) = \widehat{E\_LSF}_S(i) + P\_LSF_S(i).$$

Herein, $P\_LSF_S$ is a predicted vector of the LSF parameter of the secondary channel signal, $\widehat{E\_LSF}_S$ is the vector obtained after quantizing the prediction residual of the LSF parameter of the secondary channel signal, $\widehat{LSF}_S$ is a quantized LSF parameter vector of the secondary channel signal, i is a vector index, i=1, . . . , or M, and M is a linear prediction order. An LSF parameter vector may also be briefly referred to as an LSF parameter.

Figure 10:
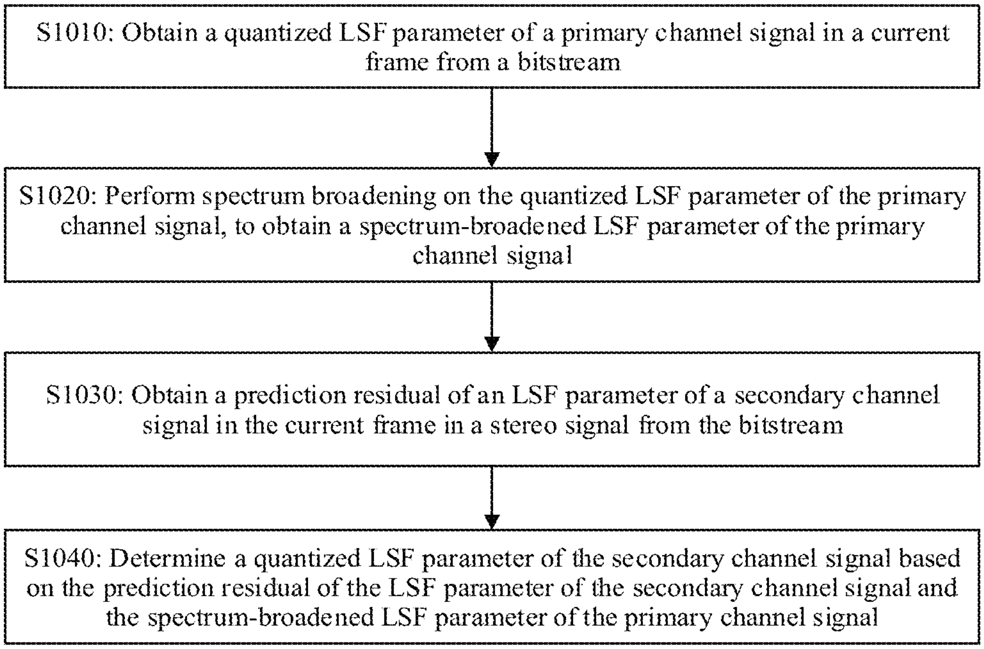
FIG. 10 is a schematic flowchart of a stereo signal decoding method according to an embodiment of this disclosure.

FIG. 10 is a schematic flowchart of a stereo signal decoding method according to an embodiment of this disclosure. When learning that a reusing determining result is that a reusing condition is not met, the decoding component 120 may perform the method shown in FIG. 10.

S1010: Obtain a quantized LSF parameter of a primary channel signal in a current frame from a bitstream.

For this step, refer to the other approaches. Details are not described herein.

S1020: Perform spectrum broadening on the quantized LSF parameter of the primary channel signal, to obtain a spectrum-broadened LSF parameter of the primary channel signal.

For this step, refer to S510. Details are not described herein again.

S1030: Obtain a prediction residual of an LSF parameter of a secondary channel signal in the current frame in a stereo signal from the bitstream.

For this step, refer to an implementation method for obtaining any parameter of a stereo signal from a bitstream in the other approaches. Details are not described herein.

S1040: Determine a quantized LSF parameter of the secondary channel signal based on the prediction residual of the LSF parameter of the secondary channel signal and the spectrum-broadened LSF parameter of the primary channel signal.

In the decoding method in this embodiment of this disclosure, the quantized LSF parameter of the secondary channel signal can be determined based on the prediction residual of the LSF parameter of the secondary channel signal. This helps reduce a quantity of bits occupied by the LSF parameter of the secondary channel signal in the bitstream.

In addition, because the quantized LSF parameter of the secondary channel signal is determined based on the LSF parameter obtained after spectrum broadening is performed on the quantized LSF parameter of the primary channel signal, a similarity feature between a linear prediction spectral envelope of the primary channel signal and a linear prediction spectral envelope of the secondary channel signal can be used. This helps improve accuracy of the quantized LSF parameter of the secondary channel signal.

In some possible implementations, the performing spectrum broadening on the quantized LSF parameter of the primary channel signal in the current frame in the stereo signal, to obtain a spectrum-broadened LSF parameter of the primary channel signal includes performing pull-to-average processing on the quantized LSF parameter of the primary channel signal to obtain the spectrum-broadened LSF parameter, where the pull-to-average processing may be performed according to the following formula:

$$LSF_{SB}(i) = \beta \cdot LSF_P(i) + (1-\beta) \cdot \overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of an original LSF parameter of the secondary channel signal, 1≤i≤M, i is an integer, and M represents a linear prediction parameter.

In a possible implementation, the performing spectrum broadening on the quantized LSF parameter of the primary channel signal in the current frame in the stereo signal, to obtain a spectrum-broadened LSF parameter of the primary channel signal includes converting the quantized LSF parameter of the primary channel signal into an LPC, modifying the LPC to obtain a modified LPC of the primary channel signal, and converting the modified LPC of the primary channel signal into an LSF parameter, where the LSF parameter obtained through conversion is the spectrum-broadened LSF parameter of the primary channel signal.

In some possible implementations, the quantized LSF parameter of the secondary channel signal is a sum of the spectrum-broadened LSF parameter of the primary channel signal and the prediction residual of the LSF parameter of the secondary channel signal.

In some possible implementations, determining a quantized LSF parameter of the secondary channel signal based on the prediction residual of the LSF parameter of the secondary channel signal and the spectrum-broadened LSF parameter of the primary channel signal may include performing two-stage prediction on the LSF parameter of the secondary channel signal based on the spectrum-broadened LSF parameter of the primary channel signal to obtain a predicted LSF parameter, and using a sum of the predicted LSF parameter and the prediction residual of the LSF parameter of the secondary channel signal as the quantized LSF parameter of the secondary channel signal.

In this implementation, for an implementation of performing two-stage prediction on the LSF parameter of the secondary channel signal based on the spectrum-broadened LSF parameter of the primary channel signal to obtain the predicted LSF parameter, refer to S720. Details are not described herein again.

Figure 11:
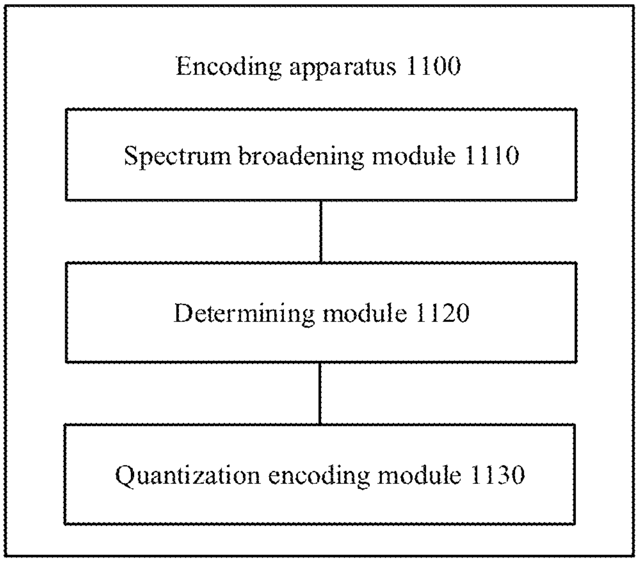
FIG. 11 is a schematic structural diagram of a stereo signal encoding apparatus according to an embodiment of this disclosure.

FIG. 11 is a schematic block diagram of a stereo signal encoding apparatus 1100 according to an embodiment of this disclosure. It should be understood that the encoding apparatus 1100 is merely an example.

In some implementations, a spectrum broadening module 1110, a determining module 1120, and a quantization module 1130 may all be included in the encoding component 110 of the mobile terminal 130 or the network element 150.

The spectrum broadening module 1110 is configured to perform spectrum broadening on a quantized line spectral frequency LSF parameter of a primary channel signal in a current frame in the stereo signal, to obtain a spectrum-broadened LSF parameter of the primary channel signal.

The determining module 1120 is configured to determine a prediction residual of an LSF parameter of a secondary channel signal in the current frame based on an original LSF parameter of the secondary channel signal and the spectrum-broadened LSF parameter of the primary channel signal.

The quantization module 1130 is configured to perform quantization on the prediction residual.

Optionally, the spectrum broadening module is configured to perform pull-to-average processing on the quantized LSF parameter of the primary channel signal to obtain the spectrum-broadened LSF parameter, where the pull-to-average processing may be performed according to the following formula:

$$LSF_{SB}(i) = \beta \cdot LSF_P(i) + (1-\beta) \cdot \overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of the original LSF parameter of the secondary channel signal, 1≤i≤M, i is an integer, and M represents a linear prediction parameter.

Optionally, the spectrum broadening module may be further configured to convert the quantized LSF parameter of the primary channel signal into a LPC, modify the LPC to obtain a modified LPC of the primary channel signal, and convert the modified LPC of the primary channel signal into an LSF parameter, where the LSF parameter obtained through conversion is the spectrum-broadened LSF parameter of the primary channel signal.

Optionally, the prediction residual of the secondary channel signal is a difference between the original LSF parameter of the secondary channel signal and the spectrum-broadened LSF parameter.

Optionally, the determining module may be further configured to perform two-stage prediction on the LSF parameter of the secondary channel signal based on the spectrum-broadened LSF parameter of the primary channel signal to obtain a predicted LSF parameter of the secondary channel signal, and use a difference between the original LSF parameter of the secondary channel signal and the predicted LSF parameter as the prediction residual of the secondary channel signal.

Before determining the prediction residual of the LSF parameter of the secondary channel signal in the current frame based on the original LSF parameter of the secondary channel signal and the spectrum-broadened LSF parameter of the primary channel signal, the determining module is further configured to determine that the LSF parameter of the secondary channel signal does not meet a reusing condition.

The encoding apparatus 1100 may be configured to perform the encoding method described in FIG. 5. For brevity, details are not described herein again.

Figure 12:
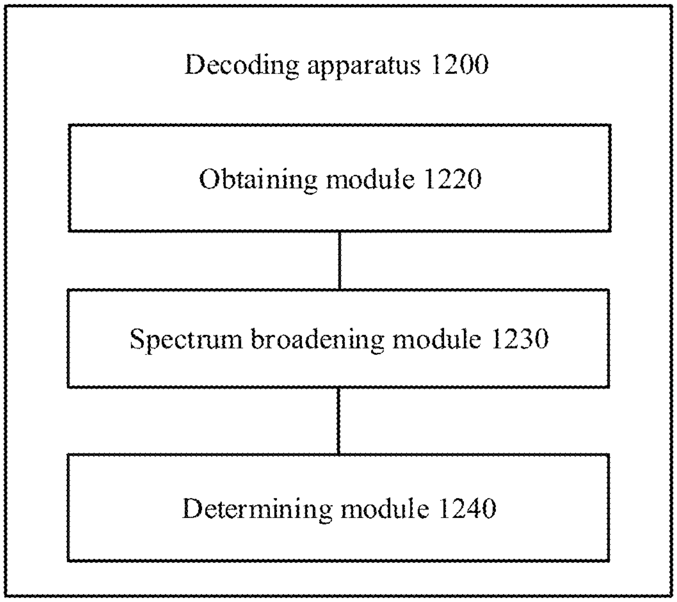
FIG. 12 is a schematic structural diagram of a stereo signal decoding apparatus according to an embodiment of this disclosure.

FIG. 12 is a schematic block diagram of a stereo signal decoding apparatus 1200 according to an embodiment of this disclosure. It should be understood that the decoding apparatus 1200 is merely an example.

In some implementations, an obtaining module 1220, a spectrum broadening module 1230, and a determining module 1240 may all be included in the decoding component 120 of the mobile terminal 140 or the network element 150.

The obtaining module 1220 is configured to obtain a quantized LSF parameter of a primary channel signal in the current frame from the bitstream.

The spectrum broadening module 1230 is configured to perform spectrum broadening on the quantized LSF parameter of the primary channel signal, to obtain a spectrum-broadened LSF parameter of the primary channel signal.

The obtaining module 1220 is further configured to obtain a prediction residual of a line spectral frequency LSF parameter of a secondary channel signal in the current frame in the stereo signal from the bitstream.

The determining module 1240 is configured to determine a quantized LSF parameter of the secondary channel signal based on the prediction residual of the LSF parameter of the secondary channel signal and the spectrum-broadened LSF parameter of the primary channel signal.

Optionally, the spectrum broadening module may be further configured to perform pull-to-average processing on the quantized LSF parameter of the primary channel signal to obtain the spectrum-broadened LSF parameter, where the pull-to-average processing may be performed according to the following formula:

$$LSF_{SB}(i)=\beta\cdot LSF_P(i)+(1-\beta)\cdot\overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of an original LSF parameter of the secondary channel signal, 1≤i≤M, i is an integer, and M represents a linear prediction parameter.

Optionally, the spectrum broadening module may be further configured to convert the quantized LSF parameter of the primary channel signal into a LPC, modify the LPC to obtain a modified LPC of the primary channel signal, and convert the modified LPC of the primary channel signal into an LSF parameter, where the LSF parameter obtained through conversion is the spectrum-broadened LSF parameter of the primary channel signal.

Optionally, the quantized LSF parameter of the secondary channel signal is a sum of the spectrum-broadened LSF parameter and the prediction residual.

Optionally, the determining module may be further configured to perform two-stage prediction on the LSF parameter of the secondary channel signal based on the spectrum-broadened LSF parameter of the primary channel signal to obtain a predicted LSF parameter, and use a sum of the predicted LSF parameter and the prediction residual as the quantized LSF parameter of the secondary channel signal.

Before obtaining the prediction residual of the line spectral frequency LSF parameter of the secondary channel signal in the current frame in the stereo signal from the bitstream, the obtaining module is further configured to determine that the LSF parameter of the secondary channel signal does not meet a reusing condition.

The decoding apparatus 1200 may be configured to perform the decoding method described in FIG. 10. For brevity, details are not described herein again.

Figure 13:
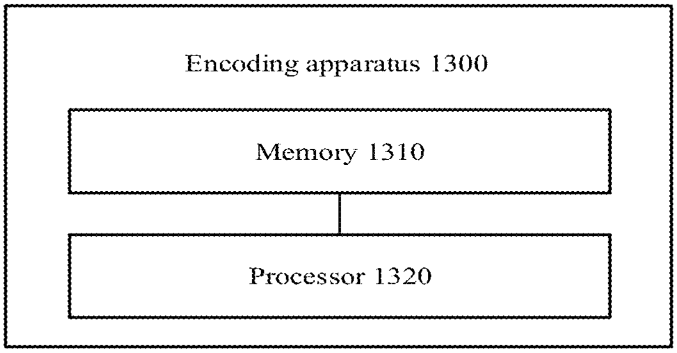
FIG. 13 is a schematic structural diagram of a stereo signal encoding apparatus according to another embodiment of this disclosure.

FIG. 13 is a schematic block diagram of a stereo signal encoding apparatus 1300 according to an embodiment of this disclosure. It should be understood that the encoding apparatus 1300 is merely an example.

A memory 1310 is configured to store a program.

A processor 1320 is configured to execute the program stored in the memory. When the program in the memory is executed, the processor is configured to perform spectrum broadening on a quantized line spectral frequency LSF parameter of a primary channel signal in a current frame in the stereo signal, to obtain a spectrum-broadened LSF parameter of the primary channel signal, determine a prediction residual of an LSF parameter of a secondary channel signal in the current frame based on an original LSF parameter of the secondary channel signal and the spectrum-broadened LSF parameter of the primary channel signal, and perform quantization on the prediction residual.

Optionally, the processor 1320 may be further configured to perform pull-to-average processing on the quantized LSF parameter of the primary channel signal to obtain the spectrum-broadened LSF parameter, where the pull-to-average processing may be performed according to the following formula:

$$LSF_{SB}(i)=\beta\cdot LSF_P(i)+(1-\beta)\cdot\overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of the original LSF parameter of the secondary channel signal, 1≤i≤M, i is an integer, and M represents a linear prediction parameter.

Optionally, the processor may be further configured to convert the quantized LSF parameter of the primary channel signal into a LPC, modify the LPC to obtain a modified LPC of the primary channel signal, and convert the modified LPC of the primary channel signal into an LSF parameter, where the LSF parameter obtained through conversion is the spectrum-broadened LSF parameter of the primary channel signal.

Optionally, the prediction residual of the secondary channel signal is a difference between the original LSF parameter of the secondary channel signal and the spectrum-broadened LSF parameter.

Optionally, the processor may be further configured to perform two-stage prediction on the LSF parameter of the secondary channel signal based on the spectrum-broadened LSF parameter of the primary channel signal to obtain a predicted LSF parameter of the secondary channel signal, and use a difference between the original LSF parameter of the secondary channel signal and the predicted LSF parameter as the prediction residual of the secondary channel signal.

Before determining the prediction residual of the LSF parameter of the secondary channel signal in the current frame based on the original LSF parameter of the secondary channel signal and the spectrum-broadened LSF parameter of the primary channel signal, the processor is further configured to determine that the LSF parameter of the secondary channel signal does not meet a reusing condition.

The encoding apparatus 1300 may be configured to perform the encoding method described in FIG. 5. For brevity, details are not described herein again.

Figure 14:
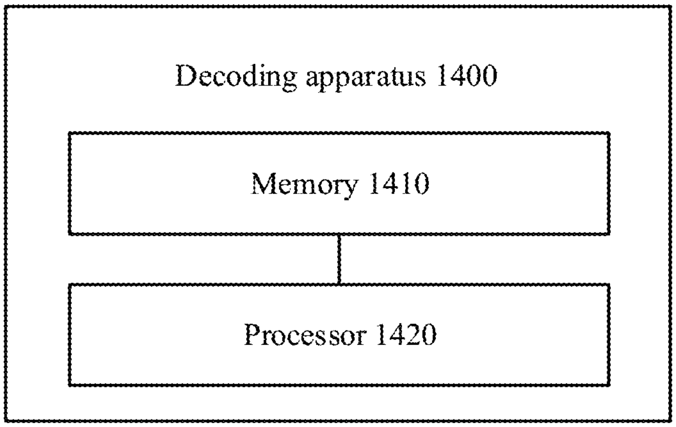
FIG. 14 is a schematic structural diagram of a stereo signal decoding apparatus according to another embodiment of this disclosure.

FIG. 14 is a schematic block diagram of a stereo signal decoding apparatus 1400 according to an embodiment of this disclosure. It should be understood that the decoding apparatus 1400 is merely an example.

A memory 1410 is configured to store a program.

A processor 1420 is configured to execute the program stored in the memory. When the program in the memory is executed, the processor is configured to obtain a quantized LSF parameter of a primary channel signal in a current frame from a bitstream, perform spectrum broadening on the quantized LSF parameter of the primary channel signal, to obtain a spectrum-broadened LSF parameter of the primary channel signal, obtain a prediction residual of a line spectral frequency LSF parameter of a secondary channel signal in the current frame in the stereo signal from the bitstream, and determine a quantized LSF parameter of the secondary channel signal based on the prediction residual of the LSF parameter of the secondary channel signal and the spectrum-broadened LSF parameter of the primary channel signal.

Optionally, the processor may be further configured to perform pull-to-average processing on the quantized LSF parameter of the primary channel signal to obtain the spectrum-broadened LSF parameter, where the pull-to-average processing may be performed according to the following formula:

$$LSF_{SB}(i) = \beta \cdot LSF_P(i) + (1-\beta) \cdot \overline{LSF_S}(i).$$

Herein, $LSF_{SB}$ represents a vector of the spectrum-broadened LSF parameter of the primary channel signal, $LSF_P(i)$ represents a vector of the quantized LSF parameter of the primary channel signal, i represents a vector index, β represents a broadening factor, 0<β<1, $\overline{LSF_S}$ represents a mean vector of an original LSF parameter of the secondary channel signal, 1≤i≤M, i is an integer, and M represents a linear prediction parameter.

Optionally, the processor may be further configured to convert the quantized LSF parameter of the primary channel signal into a LPC, modify the LPC to obtain a modified LPC of the primary channel signal, and convert the modified LPC of the primary channel signal into an LSF parameter, where the LSF parameter obtained through conversion is the spectrum-broadened LSF parameter of the primary channel signal.

Optionally, the quantized LSF parameter of the secondary channel signal is a sum of the spectrum-broadened LSF parameter of the primary channel signal and the prediction residual.

Optionally, the processor may be further configured to perform two-stage prediction on the LSF parameter of the secondary channel signal based on the spectrum-broadened LSF parameter of the primary channel signal to obtain a predicted LSF parameter, and use a sum of the predicted LSF parameter and the prediction residual as the quantized LSF parameter of the secondary channel signal.

Before obtaining the prediction residual of the line spectral frequency LSF parameter of the secondary channel signal in the current frame in the stereo signal from the bitstream, the processor is further configured to determine that the LSF parameter of the secondary channel signal does not meet a reusing condition.

The decoding apparatus 1400 may be configured to perform the decoding method described in FIG. 10. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraint conditions of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in another manner. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, function units in the embodiments of this disclosure may be integrated into one processing unit, or each of the units may exist alone physically, or two or more units may be integrated into one unit.

It should be understood that, the processor in the embodiments of this disclosure may be a central processing unit (CPU). The processor may alternatively be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

When the functions are implemented in a form of a software function unit and sold or used as an independent product, the functions may be stored in a computer-readable storage medium. Based on such an understanding, the technical solutions of this disclosure essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or a compact disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A stereo signal decoding method comprising:
- receiving a bitstream comprising a first vector of first quantized line spectral frequency (LSF) parameters of a primary channel signal in a current frame of a stereo signal and comprising a prediction residual vector of LSF parameters of a secondary channel signal in the current frame;
- obtaining the first vector from the bitstream;
- obtaining a broadening factor, wherein the broadening factor is preset and greater than 0;
- performing, based on the broadening factor, spectrum broadening on the first vector to obtain a second vector of spectrum-broadened LSF parameters of the primary channel signal; and
- determining a third vector of second quantized LSF parameters of the secondary channel signal based on the prediction residual vector and the second vector.

2. The stereo signal decoding method of claim 1, further comprising:
- obtaining a mean vector of an original LSF parameter of the secondary channel signal; and
- further performing the spectrum broadening further based on the mean vector.

3. The stereo signal decoding method of claim 1, wherein the third vector is a sum of the second vector and the prediction residual vector.

4. The stereo signal decoding method of claim 1, further comprising:
- performing, based on the second vector, a two-stage prediction to obtain a fourth vector of predicted LSF parameters; and
- setting a sum of the fourth vector and the prediction residual vector as the third vector.

5. The stereo signal decoding method of claim 1, further comprising:
- obtaining a fourth vector of the first quantized LSF parameters; and
- further performing the spectrum broadening further based on the fourth vector.

6. The stereo signal decoding method of claim 1, further comprising further obtaining the broadening factor based on one or more encoding parameters.

7. The stereo signal decoding method of claim 6, wherein the one or more encoding parameters comprise encoding modes.

8. The stereo signal decoding method of claim 6, wherein the one or more encoding parameters comprise encoding bandwidths.

9. The stereo signal decoding method of claim 6, wherein the one or more encoding parameters comprise encoding rates.

10. The stereo signal decoding method of claim 1, wherein the broadening factor is a preset constant real number.

11. An apparatus comprising:
- a memory configured to store instructions; and
- a processor coupled to the memory and configured to execute the instructions to cause the apparatus to:
  - receive a bitstream comprising a first vector of first quantized line spectral frequency (LSF) parameters of a primary channel signal in a current frame of a stereo signal and comprising a prediction residual vector of LSF parameters of a secondary channel signal in the current frame;
  - obtain the first vector from the bitstream;
  - obtain a broadening factor, wherein the broadening factor is preset and greater than 0;
  - perform, based on the broadening factor, spectrum broadening on the first vector to obtain a second vector of spectrum-broadened LSF parameters of the primary channel signal; and
  - determine a third vector of second quantized LSF parameters of the secondary channel signal based on the prediction residual vector and the second vector.

12. The apparatus of claim 11, wherein the processor is further configured to execute the instructions to cause the apparatus to:
- obtain a mean vector of an original LSF parameter of the secondary channel signal; and
- further perform the spectrum broadening further based on the mean vector.

13. The apparatus of claim 11, wherein the third vector is a sum of the second vector and the prediction residual vector.

14. The apparatus of claim 11, wherein the processor is further configured to execute the instructions to cause the apparatus to:

perform, based on the second vector, a two-stage prediction to obtain a fourth vector of predicted LSF parameters; and set a sum of the fourth vector and the prediction residual vector as the third vector.

15. The apparatus of claim 11, wherein the processor is further configured to execute the instructions to cause the apparatus to further obtain the broadening factor based on one or more encoding parameters.

16. The apparatus of claim 15, wherein the one or more encoding parameters comprise encoding modes, encoding bandwidths, or encoding rates.

17. A computer program product comprising computer-executable instructions that are stored on a non-transitory computer-readable storage medium and that, when executed by a processor, cause an apparatus to:

receive a bitstream comprising a first vector of first quantized line spectral frequency (LSF) parameters of a primary channel signal in a current frame of a stereo signal and comprising a prediction residual vector of LSF parameters of a secondary channel signal in the current frame;

obtain the first vector from the bitstream;

obtain a broadening factor, wherein the broadening factor is preset and greater than 0;

perform, based on the broadening factor, spectrum broadening on the first vector to obtain a second vector of spectrum-broadened LSF parameters of the primary channel signal; and determine a third vector of second quantized LSF parameters of the secondary channel signal based on the prediction residual vector and the second vector.

18. The computer program product of claim 17, wherein the computer-executable instructions, when executed by the processor, further cause the apparatus to:

obtain a mean vector of an original LSF parameter of the secondary channel signal; and further perform the spectrum broadening further based on the mean vector.

19. The computer program product of claim 17, wherein the third vector is a sum of the second vector and the prediction residual vector.

20. The computer program product of claim 17, wherein the computer-executable instructions, when executed by the processor, further cause the apparatus to:

perform, based on the second vector, a two-stage prediction to obtain a fourth vector of predicted LSF parameters; and set a sum of the fourth vector and the prediction residual vector as the third vector.

* * * * *